(12) United States Patent
Rayner

(10) Patent No.: US 10,657,011 B2
(45) Date of Patent: May 19, 2020

(54) SIGNAL PROTECTION

(71) Applicant: Nevion Europe AS, Sandefjord (NO)

(72) Inventor: Andrew Rayner, Felixstowe (GB)

(73) Assignee: Nevion AS (NO)

( * ) Notice: Subject to any disclaimer, the term of this patent is extended or adjusted under 35 U.S.C. 154(b) by 0 days.

(21) Appl. No.: 15/626,471

(22) Filed: Jun. 19, 2017

(65) Prior Publication Data

US 2017/0286241 A1    Oct. 5, 2017

Related U.S. Application Data

(63) Continuation of application No. 14/923,317, filed on Oct. 26, 2015, now Pat. No. 9,684,572, which is a continuation of application No. 13/855,961, filed on Apr. 3, 2013, now Pat. No. 9,172,507.

(60) Provisional application No. 61/625,063, filed on Apr. 16, 2012, provisional application No. 61/619,907, filed on Apr. 3, 2012.

(51) Int. Cl.

| | |
|---|---|
| *G06F 11/20* | (2006.01) |
| *H04L 1/08* | (2006.01) |
| *H04L 1/22* | (2006.01) |
| *G06F 11/10* | (2006.01) |
| *H04L 1/00* | (2006.01) |
| *H04L 1/18* | (2006.01) |

(52) U.S. Cl.
CPC ......... *G06F 11/2005* (2013.01); *G06F 11/10* (2013.01); *H04L 1/0041* (2013.01); *H04L 1/0045* (2013.01); *H04L 1/08* (2013.01); *H04L 1/22* (2013.01); *H04L 1/1867* (2013.01)

(58) Field of Classification Search
CPC .................................................. G06F 11/2005
See application file for complete search history.

(56) References Cited

U.S. PATENT DOCUMENTS

| | | | | |
|---|---|---|---|---|
| 4,229,815 A | * | 10/1980 | Cummiskey | H04L 25/05 341/61 |
| 5,153,578 A | * | 10/1992 | Izawa | H04L 49/552 340/2.23 |
| 5,577,196 A | * | 11/1996 | Peer | H04J 3/14 370/225 |
| 5,680,389 A | * | 10/1997 | Douglas | H04B 1/74 370/228 |
| 5,828,677 A | | 10/1998 | Sayeed et al. | |
| 6,463,472 B1 | | 10/2002 | Van Loo | |
| 6,556,540 B1 | * | 4/2003 | Mawhinney | H04L 1/20 370/229 |

(Continued)

FOREIGN PATENT DOCUMENTS

| | | |
|---|---|---|
| EP | 2061174 A1 | 5/2009 |
| KR | 1020050033418 A | 4/2005 |
| WO | 03005629 A1 | 1/2003 |

OTHER PUBLICATIONS

Begen, A et al., Duplicating RTP Streams, Internet Engineering Task Force(IETF) Trust Document, Jul. 2, 2012, pp. 1-11, Internet-Draft, University of Glasgow. See first page showing revision history.

(Continued)

*Primary Examiner* — Steve N Nguyen
(74) *Attorney, Agent, or Firm* — Paul D. Chancellor; Ocean Law

(57) ABSTRACT

A signal protector utilizes a variable latency station to provide error correction.

9 Claims, 6 Drawing Sheets

(56) References Cited

U.S. PATENT DOCUMENTS

| | | | | |
|---|---|---|---|---|
| 6,587,236 | B1* | 7/2003 | Butler | H04B 10/00 |
| | | | | 398/12 |
| 6,658,457 | B2* | 12/2003 | Nishikawa | H04L 12/5602 |
| | | | | 370/223 |
| 7,424,567 | B2* | 9/2008 | Manula | G06F 13/423 |
| | | | | 710/310 |
| 8,305,879 | B2* | 11/2012 | Gregg | G06F 11/2094 |
| | | | | 370/217 |
| 2003/0023739 | A1* | 1/2003 | Ngoc Vu | H04L 12/1868 |
| | | | | 709/230 |
| 2009/0185479 | A1 | 7/2009 | Hart et al. | |
| 2010/0098185 | A1* | 4/2010 | Miyazaki | H04B 7/0669 |
| | | | | 375/267 |

OTHER PUBLICATIONS

Begen, A et al., Duplicating RTP Streams, Internet Engineering Task Force(IETF) Trust Document, Dec. 30, 2012, pp. 1-11, Internet-Draft, University of Glasgow.

Begen, A et al., Duplicating RTP Streams, Internet Engineering Task Force(IETF) Trust Document, Mar. 21, 2013, pp. 1-10, Internet-Draft, University of Glasgow.

* cited by examiner

| Index | Transmit Buffer | Network Path A | | Network Path B | | Receive Buffer | Time | | | | |
|---|---|---|---|---|---|---|---|---|---|---|---|
| | | Feed | Return | Feed | Return | | r1 | t1 | r2 | t2 | r3 |
| 1 | Sending to A | Active | | | | Receiving from A | | | | | |
| 2 | | Active | | | | Discover Error, Request Resend | ▨ | | | | |
| 3 | | Active | Active | | | | | ▨ | | | |
| 4 | Receive Request, Prepare To Resend | Active | | | | | | | ▨ | | |
| 5 | Resending Postlaunch Data on B | Active | | Active | | | | | | ▨ | |
| 6 | | | | Active | | Begin To Receive Resend, Merging | | | | | ▨ |
| 7 | Sending to B | | | Active | | Receiving from B | | | | | |

FIG. 7

SIGNAL PROTECTION

PRIORITY CLAIM

This application is a continuation of U.S. patent application Ser. No. 14/923,317 filed Oct. 26, 2015 entitled SIGNAL PROTECTION, which is a continuation of U.S. patent application Ser. No. 13/855,961 filed Apr. 3, 2013 now U.S. Pat. No. 9,172,507 which claims the benefit of U.S. Prov. Pat. App. No. 61/619,907 filed Apr. 3, 2012 entitled DYNAMIC BUFFER SIGNAL PROTECTION and U.S. Prov. Pat. App. No. 61/625,063 filed Apr. 16, 2012 entitled SIGNAL PROTECTION.

BACKGROUND OF THE INVENTION

Known signal protection schemes include error correction using multiple channels and/or large static buffers. Such systems utilize excessive bandwidth and/or introduce relatively long latency. Although signal protection innovations are not a focus area of the telecommunications industry, improvements that are adopted by the industry have the potential to benefit large groups of consumers.

FIELD OF INVENTION

This invention relates to the electrical arts. In particular, a signal is protected through the use of a dynamic buffer.

DISCUSSION OF THE RELATED ART

Some signal protection systems are known. For example, some signal protection systems using dual paths that allow for switching between a failed/failing path and an alternate path are known. These dual path systems consume identical bandwidth on two paths because both paths carry the active feed; one path provides a main signal and one path provides an identical standby signal. Further, some forward error correction schemes are known. Their development has not generally been a focus area of the telecommunications industry, perhaps due to the use of the dual path protection systems mentioned above. But, known systems generally suffer from one or more of hardware complexity, software complexity, high initial cost, high operating costs, large additions to required bandwidth, and signal degradation. Selected embodiments of the present invention provide solutions to one or more of these problems.

SUMMARY OF THE INVENTION

The present invention provides a signal protector. Embodiments utilize a variable latency station. In various embodiments, a signal protector allows one or more of transparent, seamless, and uninterrupted protection of a feed across a dual network while consuming bandwidth on a single connection at any point in time. And, in various embodiments, a signal protector allows one or more of transparent, seamless, and uninterrupted protection of a feed across a dual network while consuming bandwidth principally on a single connection.

In an embodiment, the invention provides means and methods for transparent and/or seamless protection of a feed across a dual network while limiting bandwidth consumption to a single connection while there are no communications errors.

And, in an embodiment, a signal protector comprises: first and second buffers in signal communication via path A and path B; the buffers having first and second buffer lengths (seconds of data); the first and second buffer lengths being a function of two times the path time of the longer of paths A and B; the signal protector operative to use one of the paths before there is a signal loss event on that path; the signal protector operative to use the other of the paths after the signal loss; and, the buffer sizes being selected to allow for seamless data throughput.

In an embodiment, a data protection method comprises the steps of: providing data path A and data path B; each of the data paths extending between first and second stations; the first station providing data to path A; the second station receiving data initially from data path A; and, providing an uninterrupted second station output following a data fault via utilizing a buffer of the second station to maintain an unfaulted second station output after the data fault is detected, the first station providing data to data path B, the data including resend data from a first station buffer, the resend data including the faulted data, and the data from data path B bypassing at least a portion of the second station buffer to merge the resent data with the data remaining in the second station buffer.

Some embodiments further comprise the steps of: sizing the buffer of the second station such that the time required for a bit to traverse the second station buffer equals or exceeds t; where t=t1+t2; where t1 equals the time required for one bit of data to traverse path A; and, where t2 equals the time required for one bit of data to traverse path B.

Some embodiments further comprise the steps of: sizing the buffer of the first station such that the time required for a bit to traverse the first station buffer equals or exceeds t.

Some embodiments further comprise the steps of: sizing the buffer of the second station such that the time required for a bit to traverse the second station buffer equals or exceeds t+r1+r2+r3; where t=t1+t2; where t1 equals the time required for one bit of data to traverse path A; where t2 equals the time required for one bit of data to traverse path B; where r1 equals the time required by the second station to detect the fault; where r2 equals the time required by the first station to respond to a received request to resend data including data replacing the faulty data; and, where r3 equals the time required by the second station to merge resent data with data remaining in the second station buffer.

Some embodiments further comprise the steps of sizing the buffer of the first station such that the time required for one bit of data to traverse the first station buffer equals or exceeds t+r1+r2.

Some embodiments further comprise the step of the second station sending a request to resend data replacing the faulty data and the first station receiving the request during a time period substantially equal to t1.

Some embodiments further comprise the step of the first station beginning to send resend data and the second station beginning to receive resend data during a time period substantially equal to t2.

Some embodiments further comprise the step of rebuilding the second station buffer wherein rebuild operations include operating path B at a data rate higher than a nominal data rate for path B, utilizing some of the path B data to maintain a second station buffer output at its nominal data rate, utilizing some of the path B data to rebuild the second station buffer, and returning the path B data rate to its nominal data rate after the second station buffer has been rebuilt.

Some embodiments further comprise the step of the second station relying on path B to maintain the second station buffer.

Some embodiments further comprise the step of relying on path A to rebuild and maintain the second station buffer following a transmission fault detected while path B is active.

BRIEF DESCRIPTION OF THE DRAWINGS

The present invention is described with reference to the accompanying figures. The figures, incorporated herein and forming part of the specification, illustrate the present invention and, together with the description, further serve to explain the principles of the invention and to enable a person skilled in the relevant art to make and use the invention.

FIG. 7 shows an exemplary timing diagram of the protection system of FIG. 6.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Where parts are connected, descriptions herein include the term "coupled" which refers to either direct or indirect connections. Direct connections provide for a first part connected directly to a second part, for example A connected directly to B. Indirect connections provide for a first part connected indirectly to a second part, for example A connected indirectly to C via B.

Figure 1:
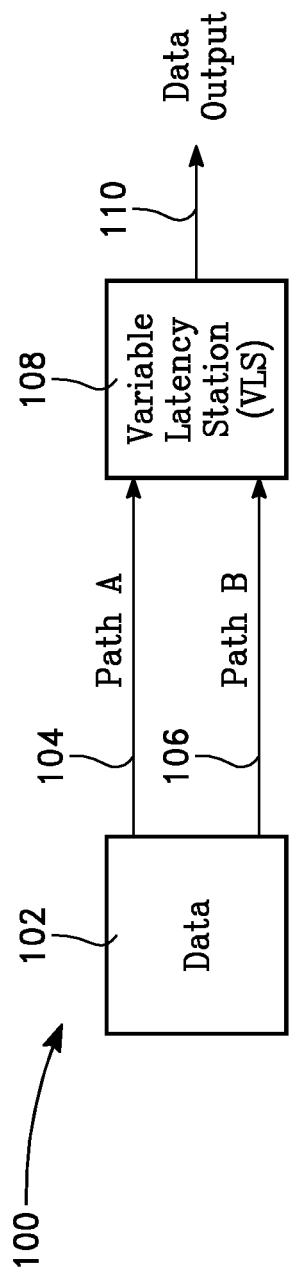
FIG. 1 a protection system in accordance with the present invention.

FIG. 1 shows a signal protection system in accordance with the present invention 100. A variable latency station "VLS" 108 and a source of data 102 are in signal communications via communications paths A 104 and B 106. In various embodiments, the VLS is operable to correct faulty data before it reaches a VLS output 110.

Figure 2:
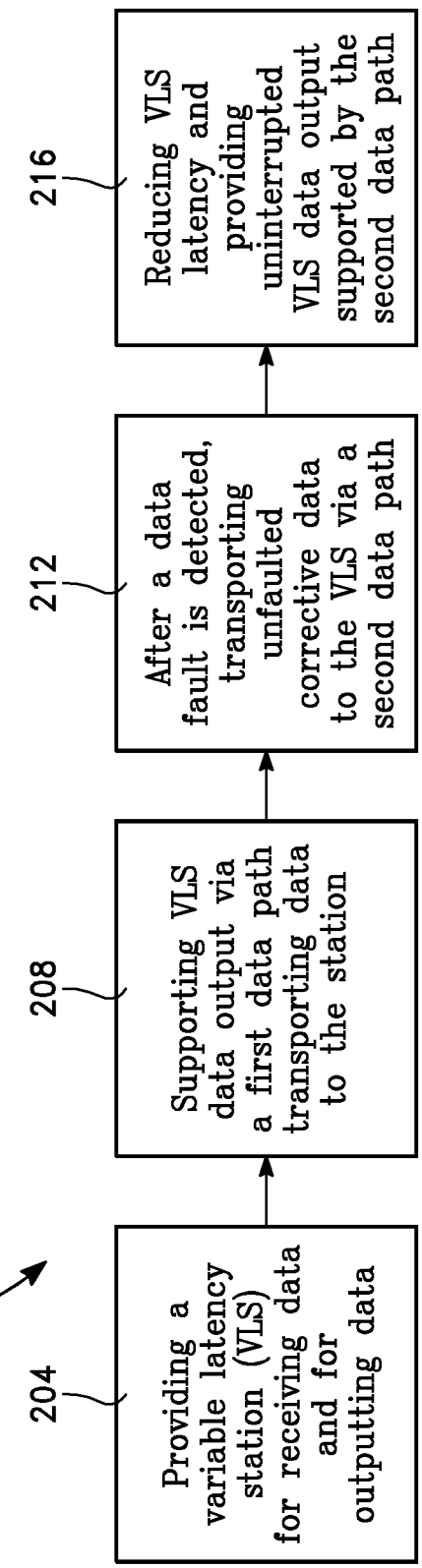
FIG. 2 shows exemplary operation of the protection system of FIG. 1.

FIG. 2 shows an exemplary operation of the signal protection system of FIG. 1 200. A VLS for receiving data and for outputting data is provided 204. VLS data output is initially supported via a first data path, such as Path A, that transports data to the station 208. After a data fault is detected, such as a fault detected in the VLS, unfaulted corrective data is transported to the VLS via a second data path, such as Path B 212. Error correction with uninterrupted VLS data output includes reducing VLS latency, for example bypassing at least a portion of a VLS buffer, and switching VLS data output support from the first path to the second path 216.

Figure 3:
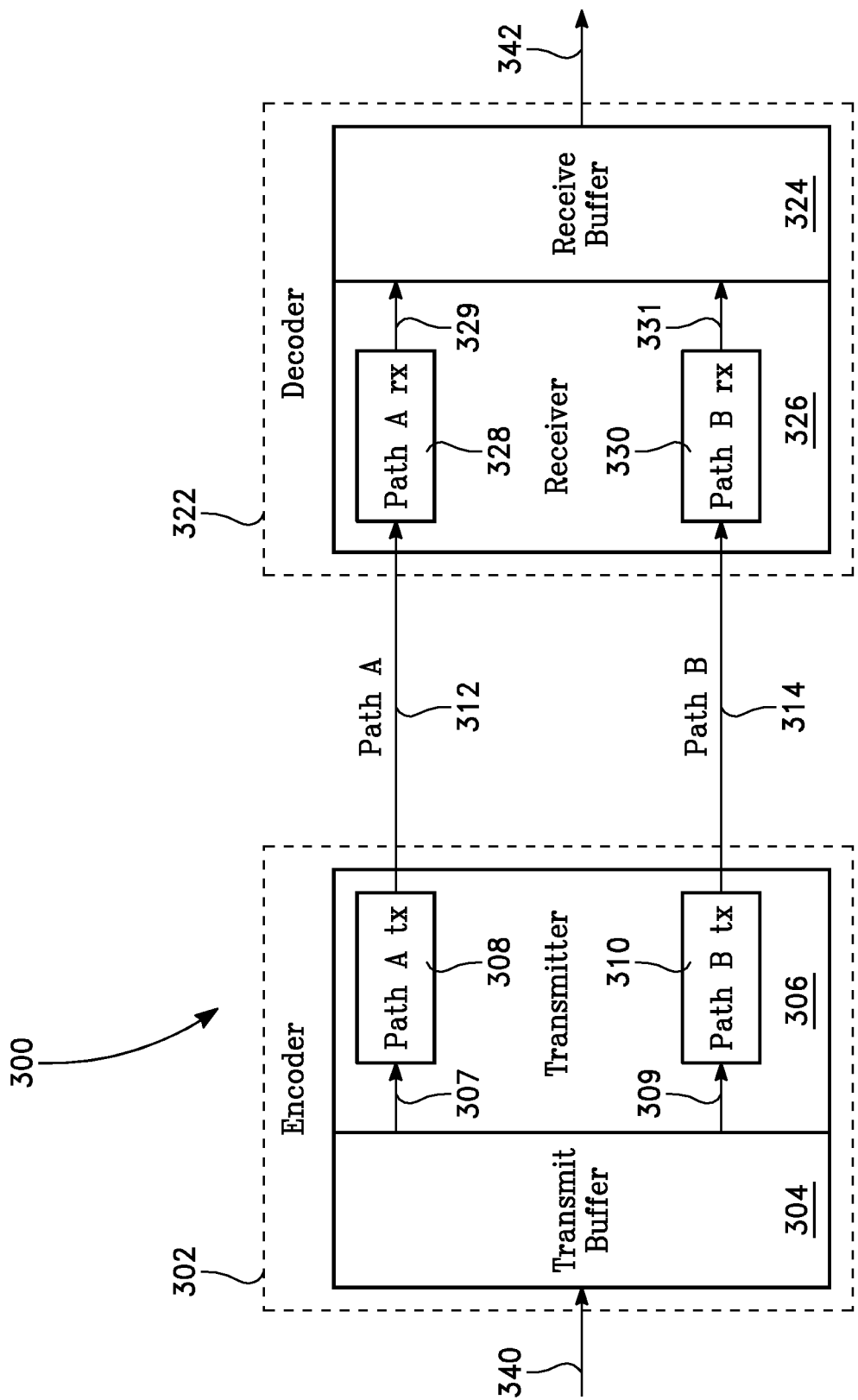
FIG. 3 shows another embodiment of the protection system of FIG. 1.

FIG. 3 shows a signal protection system embodiment with transmit and receive buffers 300. An encoder 302 with a data input 340 and a decoder 322 with a data output are in signal communications via communications paths A 312 and B 314. As is further described below, decoder variable latency enables correction of faulty data before it reaches the decoder output.

The encoder 302 incorporates a transmit buffer 304 for receiving data from a transmit buffer data input 340 and a transmitter 306 for transmitting transmit buffer data to the decoder 322. In various embodiments, the transmitter includes a Path A transmitter 308 and a Path B transmitter 310 coupled between transmit buffer outputs 307, 309 and respective data paths Path A and Path B.

The decoder 322 incorporates a receiver 326 coupled between Paths A and B and a receive buffer 324. The receive buffer is coupled to a decoder data output 342. In various embodiments, the receiver includes a Path A receiver 328 and a Path B receiver 330 coupled between receiver buffer inputs 329, 331 and respective data paths Path A and Path B.

Figure 4:
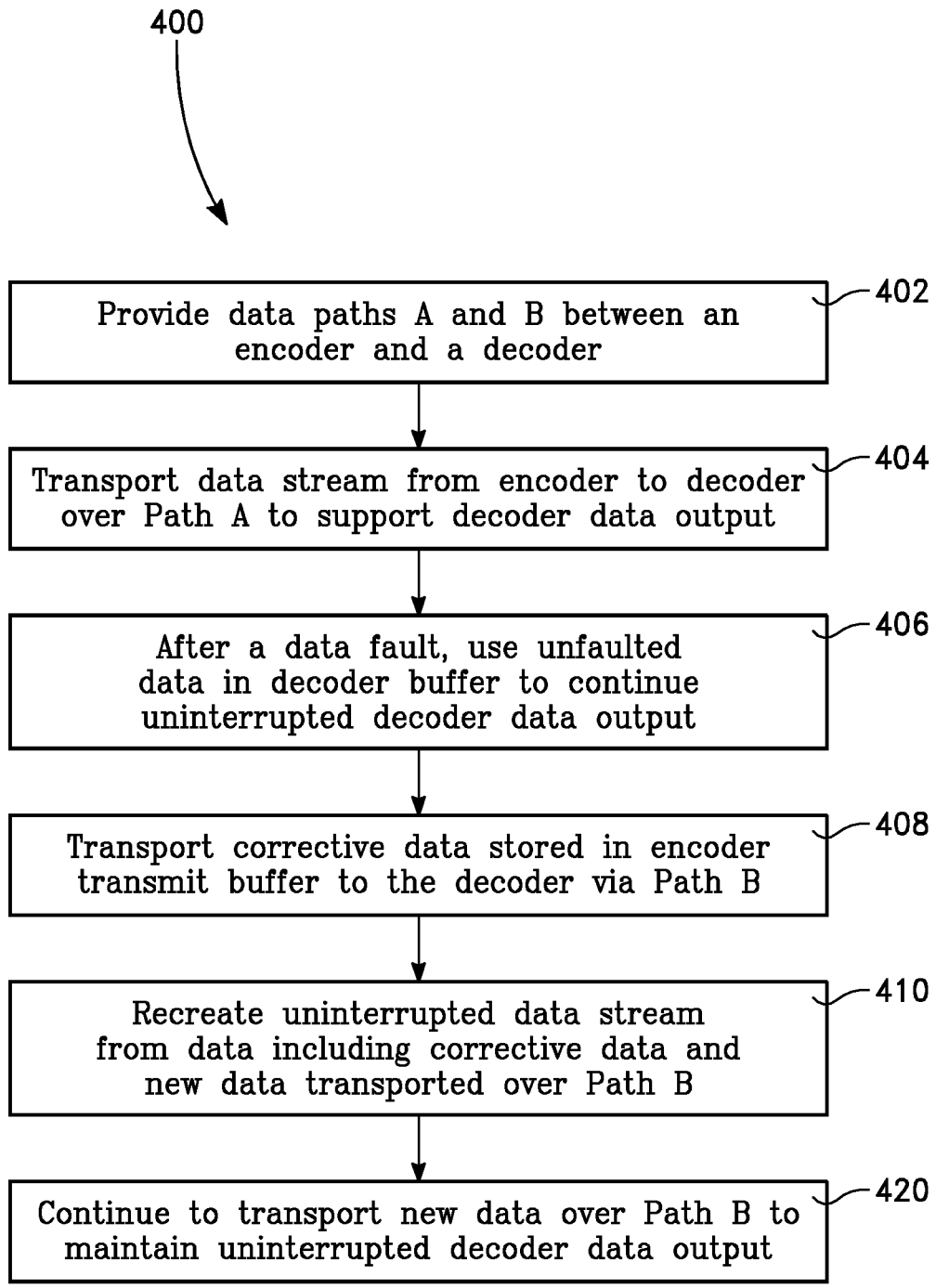
FIG. 4 shows exemplary operation of the protection system of FIG. 3.

FIG. 4 shows exemplary operation of the signal protection system of FIG. 3 400. An encoder and a decoder are provided with data paths A and B therebetween 402. Initially, a data stream is transported from the encoder to the decoder over Path A to support decoder data output 404. After a data fault, unfaulted data in the decoder buffer is used to support uninterrupted decoder data output 406. Correction includes transporting corrective data and rebuilding the data stream in the decoder. Corrective data stored in the encoder transmit buffer is transported to the decoder 408. An uninterrupted data stream is recreated from data including corrective data and new data transported over Path B 410. Transport of new data over Path B continues and maintains uninterrupted decoder data output 420.

Figure 5:
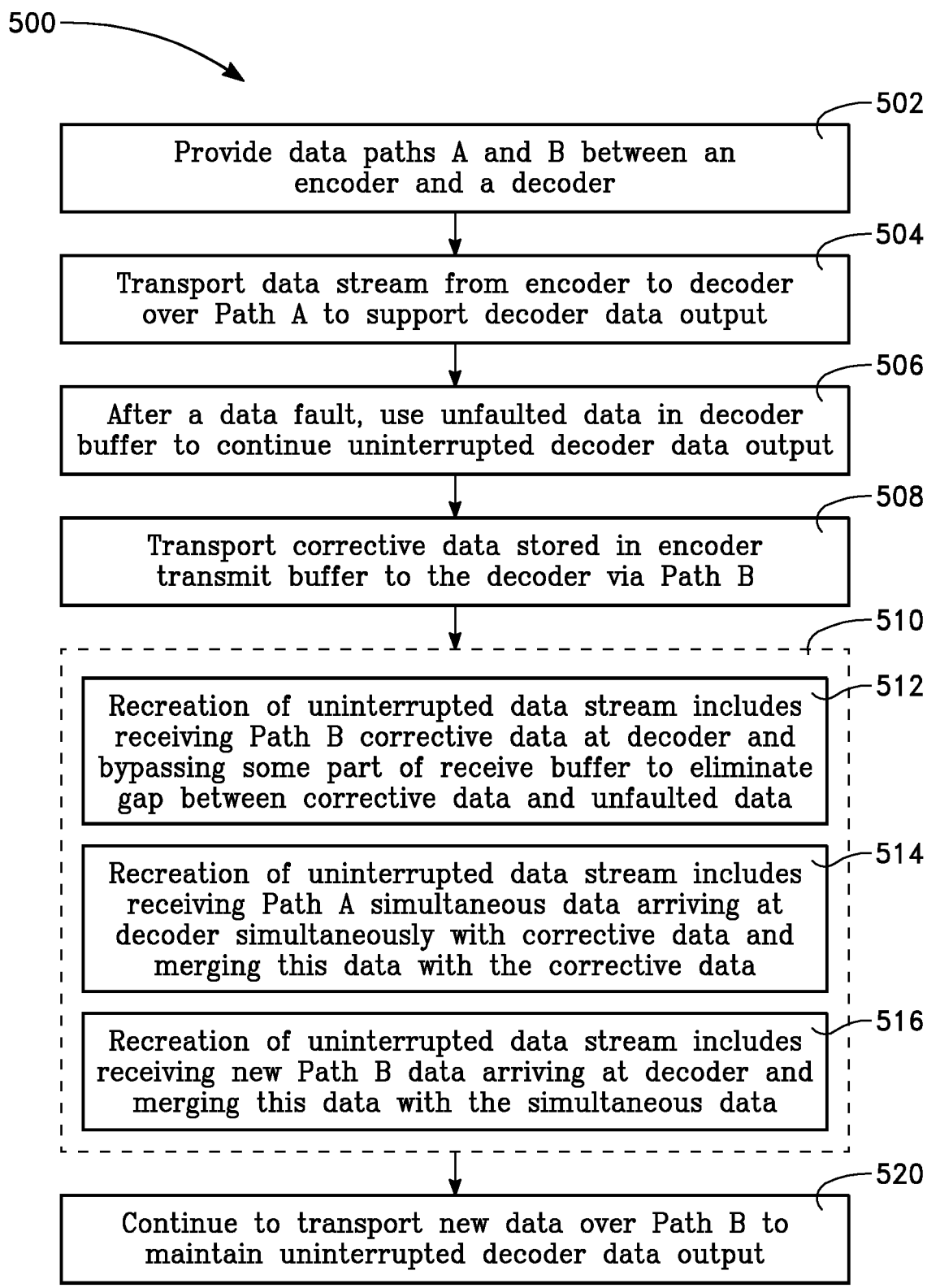
FIG. 5 shows exemplary operation of the protection system of FIG. 4.

FIG. 5 shows another example of operation of the signal protection system of FIG. 3 500. An encoder and a decoder are provided with data paths A and B therebetween 502. Initially, a data stream is transported from the encoder to the decoder over Path A to support decoder data output 504. After a data fault, unfaulted data in the decoder buffer is used to support uninterrupted decoder data output 506. Correction includes transporting corrective data and rebuilding the data stream in the decoder. Corrective data stored in the encoder transmit buffer is transported to the decoder 508. An uninterrupted data stream is recreated from data including corrective data and new data transported over Path B 510. Transport of new data over Path B continues and maintains uninterrupted decoder data output 520.

Recreation of the uninterrupted data stream 510 includes: receiving Path B corrective data at the decoder and bypassing some part of the receive buffer to eliminate gap between corrective data and unfaulted data 512; receiving Path A simultaneous data arriving at the decoder simultaneously with corrective data and merging this data with the corrective data 514; and, receiving new Path B data arriving at the decoder and merging this data with the simultaneous data 516.

Persons of ordinary skill in the art will recognize the decoder receive buffer 324 is not filled after the correction process described above. The buffer can be refilled by increasing the data rate between the encoder and the decoder such that it exceeds the data rate required to support the decoder output. For example, the data rate of Path B can be increased, Paths A and B can be used simultaneously, or both of these techniques can be used.

Figure 6:
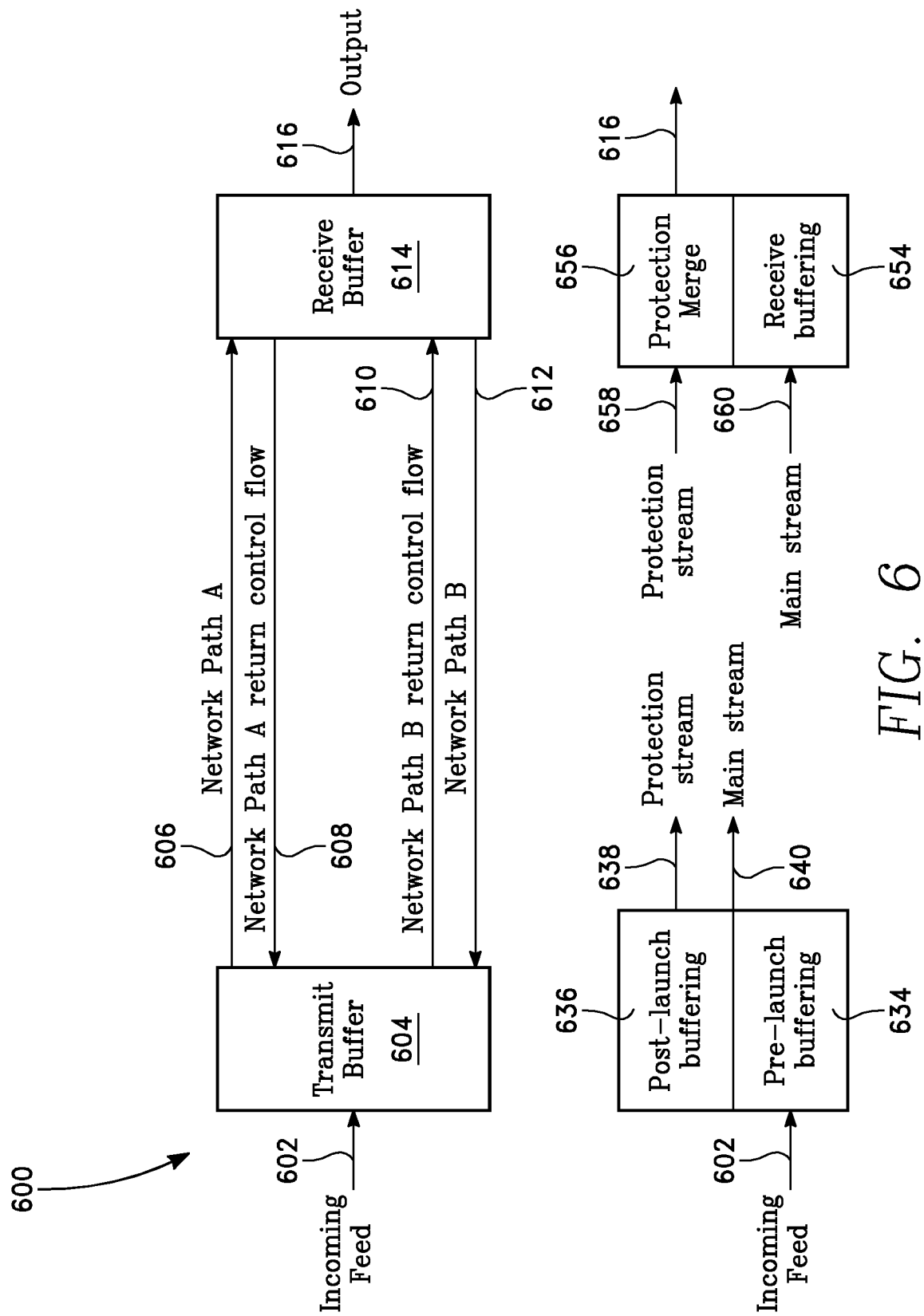
FIG. 6 shows another embodiment of the protection system of FIG. 1.

FIG. 6 shows a signal protection system embodiment with return control paths A and B 600. A transmit buffer 604 with an incoming feed 602 and a receive buffer 614 with an output 616 are in signal communication via Network Paths A 606 and B 612. Each of the network paths has a corresponding return control path 608, 610.

The transmit buffer 604 includes pre and post launch buffering 634, 636. The pre-launch buffering receives an incoming feed 602 and supports a main stream output 640. The post-launch buffering 636 maintains a corrective copy of launched data that is transported as a protection stream 638. In the event of a data fault, a data path other than the main network data path is used to transport the protection stream. For example, transport of the main stream over Network Path A immediately prior to a data fault would result in transport of the protective stream over Network Path B immediately after the data fault.

The receive buffer 614 includes receive buffering 654 and protection merge 656. Main stream data 660 is delivered to the receive buffering and protection data 658 is delivered to the protection merge. When there is no data fault, the receive buffering data is not manipulated by the protection merge and the data is delivered to the receive buffer output 616. Alternatively, a data error results in operation of the protection merge which merges unfaulted data from the receive buffering with the protective stream 638.

In an exemplary operating mode, buffer sizing is illustrated.

a. For example, the path time T is approximately 10 ms which is equivalent to approximately 2,000 km (and therefore a return trip time is ~20 ms). (t is the value of the longest of the 2 paths). 'r' is a value that allows for response times at each end plus a small margin—typically 5 ms b. A keep-alive 'OAM' packet flow is maintained on both paths—sending approximately 1 packet-per-second (on same IP address as media flow but different port number) from the encoder to decoder c. The round trip time is continually monitored with the use of a return packet OAM from decoder to encoder d. Encoder sends actual traffic on only path A (for example)

e. Encoder fills transmit buffer to a level of 3t (30 ms)—this is r (5 ms) pre-send and 2t+r (25 ms) post-send (i.e., the transmit buffer always contains the last 25 ms of data already transmitted) (this value is varied according to the measured round-trip time)

f. Upon receiving the stream, the decoder fills receive buffer to 2t+r (25 ms) before starting to output i.e. there is a 25 ms worth of data held in output buffer g. If the path A signal is lost at the decoder, the decoder signals to the encoder to indicate a lost feed
Time taken=loss detection time plus t (10 ms). The decoder continues to output data from its buffer h. At this point the encoder commences transmission of the feed on path B, but from the end of the buffer—i.e., it is re-transmitting the last 25 ms that has already been sent i. Upon receipt of the stream on the B feed, the decoder takes this stream (discarding any duplicate packets) to maintain a continual output flow j. Once this process is complete, the decoder indicates to the encoder the amount of buffer fill it currently now has and how much it needs to be re-filled to be ready for another protection event k. The encoder then enters a 'nominal bit rate plus a bit' transmission period to get the decoder buffer back to normal operating point (the alternative technique that could be used here is two also use path A when it recovers—i.e. both paths in use for a fraction of a second)

l. Once the OAM on path A indicates it has been restored, the system is ready to protect again, the other way As persons of ordinary skill in the art will appreciate, round-trip path length is approximated above as two times the length of the longer path. Where the paths are of substantially different lengths, the round-trip path length can be more accurately represented as t1 and t2. Similarly, encoder/decoder reaction times can be represented as the time to detect a fault in the encoder r1, the time for the encoder to assemble and launch a message requesting corrective data from the decoder r2, and the time for the decoder to interpret this message and launch the corrective data r3.

FIG. 7 shows a timing table illustrative of an exemplary operating mode of the protection system of FIG. 6 700.

a. At index 1, the protection system is sending via Path A b. At index 2, the protection system is sending via Path A, discovers an error and requests a resend (r1)

c. At index 3, the protection system is sending via Path A and the resend message is being transported over Network Path A return (t1)

d. At index 4, the protection system is sending over path A and the protection system receives the resend request and prepares to resend (r2)

e. At index 5, the protection system is sending over path A and the protection system is sending the post-launch/corrective data over path B (t2)

f. At index 6, the protection system begins to receive the corrective data and begins merging data to maintain an uninterrupted output (r3)

g. At index 7, the protection system is sending data over Path B

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A data protection method comprising the steps of:
providing data paths A and B between an encoder and a decoder;
transporting a data stream from the encoder to the decoder over path A to supply a decoder data output;
if there is a data fault, using unfaulted data in a decoder buffer to continue decoder data output without interruption;
transporting corrective data stored in an encoder transmit buffer to the decoder via path B;
continuing an uninterrupted supply of data to the decoder data output using the corrective data and the encoder data stream transported over path B;
wherein data path B does not redundantly propagate the same data values as data path A and bandwidth consumption is limited to a single connection while there are no communications errors.

2. The data protection method of claim 1 wherein absent a data fault, there is no transporting of corrective data stored in an encoder transmit buffer to the decoder via path B.

3. The data protection method of claim 2 wherein after a data fault, the data stream earlier transported over path A is used to continue decoder data stream output.

4. The data protection method of claim 1 wherein data received by path B is a copy of data earlier received by path A.

5. The data protection method of claim 4 wherein absent a data fault, there is not transporting of data stored in an encoder transmit buffer to the decoder.

6. The data protection method of claim 1 wherein only path A data is examined to find a data fault.

7. The data protection method of claim 1 wherein protection includes a request that data be resent when there is data fault.

8. The data protection method of claim 1 wherein there is a single decoder buffer.

9. A data protection method comprising the steps of:
   providing data paths A and B between an encoder and a decoder;
   path A receiving from the encoder a data stream for supplying a decoder data output;
   after a data fault, using unfaulted data in a decoder receive buffer to continue decoder data output without interruption;
   in response to the data fault, path B receiving from an encoder transmit buffer the same data stream earlier received by path A;
   continuing an uninterrupted supply of data to the decoder data output using the path B data;
   wherein data path B does not redundantly propagate the same data values as data path A and bandwidth consumption is limited to a single connection while there are no communications errors.

* * * * *